United States Patent [19]
Taylor

[11] Patent Number: 5,860,442
[45] Date of Patent: Jan. 19, 1999

[54] FLUID PRESSURE SHUTOFF AND RELIEF VALVE

[76] Inventor: Julian S. Taylor, 8320 SW. 8, Oklahoma City, Okla. 73128

[21] Appl. No.: 636,021

[22] Filed: Apr. 22, 1996

Related U.S. Application Data

[63] Continuation-in-part of Ser. No. 588,469, Jan. 18, 1996.
[51] Int. Cl.⁶ .................................................. F61K 17/14
[52] U.S. Cl. .................................... 137/68.11; 137/115.18
[58] Field of Search ........................... 137/68.11, 115.16, 137/115.18

[56] References Cited

U.S. PATENT DOCUMENTS 3,451,416  6/1969  Nyberg ................................ 137/115.18
4,724,857  2/1988  Taylor ...................................... 137/71 X Primary Examiner—John Fox
Attorney, Agent, or Firm—Robert K. Rhea

[57] ABSTRACT

A safety valve for a preventing over pressure in a fluid processing system utilizing a fluid pressure regulator in a fluid supply line upstream from the processing vessel is formed by a valve, normally maintained open by a pressure responsive collapsible pin, interposed in the fluid supply line upstream or downstream from the pressure regulator. Fluid pressure above a predetermined limit in a tube connecting the safety valve with the downstream side of the pressure regulator axially moves a piston in the safety valve toward and axially collapses the pin to close the safety valve and vent pressure downstream from the valve.

8 Claims, 3 Drawing Sheets

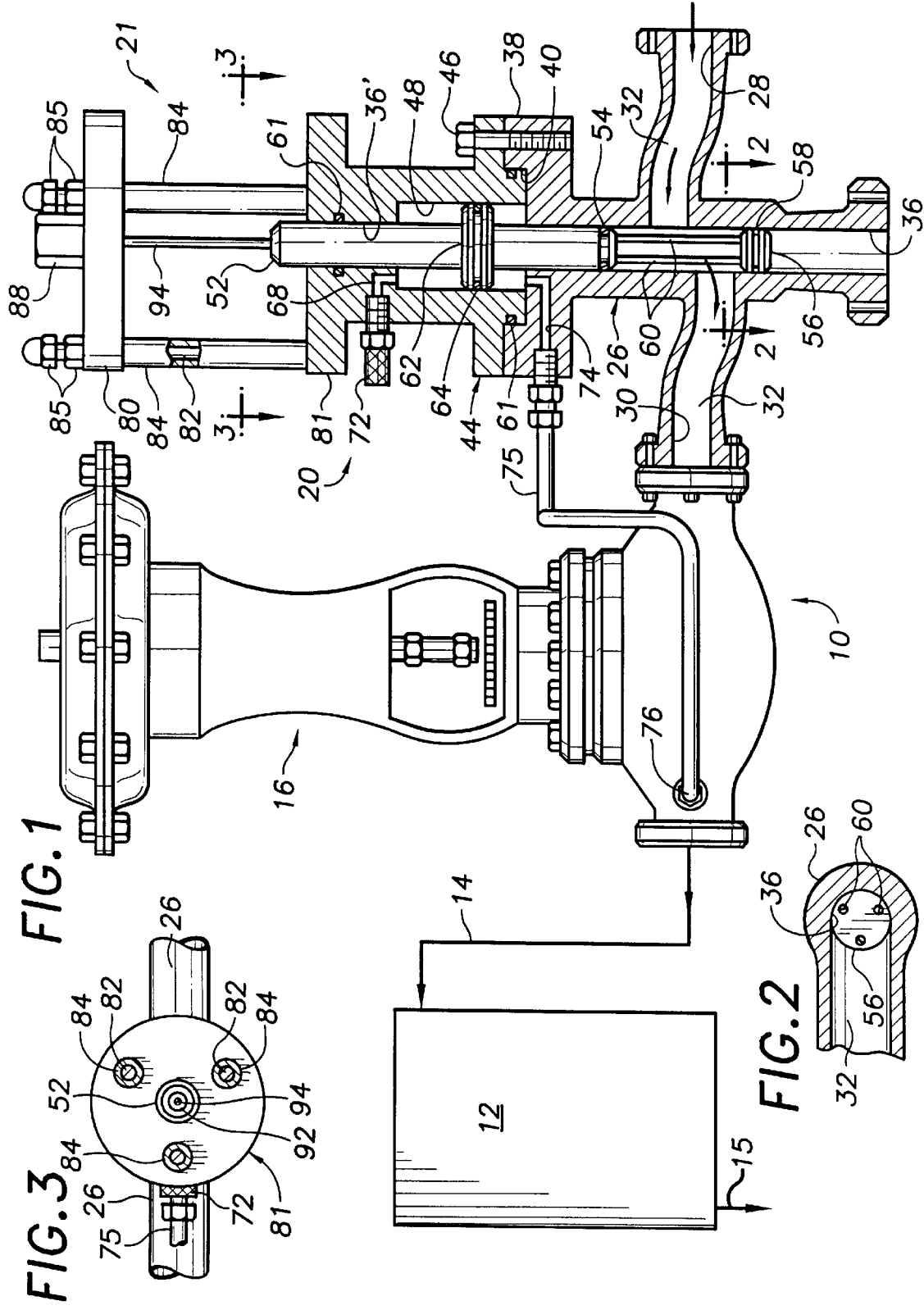

FLUID PRESSURE SHUTOFF AND RELIEF VALVE

This invention is a continuation-in-part of an application filed in the United States patent office Jan. 18, 1996, Ser. No. 08/588,469 for Heat Exchanger Pressure SHUTOFF VALVE.

BACKGROUND OF THE INVENTION

This invention relates to fluid processes and more particularly to a pressure shutoff valve monitoring fluid pressure in a fluid process vessel.

1. Field of the Invention

A fluid process contained by a vessel is continually supplied with fluid at a predetermined pressure regulated by a pressure regulator interposed in the fluid supply line. However, fluid regulators sometimes fail, and usually fail in the open position, thus allowing pressure above the predetermined limit to enter the pressure fluid processing vessel. Even if a second regulator is interposed in tandem in the line leading to the vessel it does not solve the problem for the reason that when one regulator fails a second companion downstream regulator usually also fails, and in the open position.

This invention solves the problem of a failed pressure regulator by a normally open pressure shutoff and relief valve, interposed in the fluid supply line upstream or downstream from a fluid pressure regulator connected with a process vessel. The shutoff valve monitors fluid supply pressure on the downstream side of the fluid pressure regulator, and is biased closed by fluid pressure above a predetermined limit and bypasses the fluid to a suitable line or receptacle.

2. Description of the Prior Art

I do not know of any patents disclosing this feature.

SUMMARY OF THE INVENTION

A fluid pressure monitoring and over pressure shutoff valve is interposed in a fluid supply line upstream or downstream from a fluid pressure regulator supplying fluids being processed in a process vessel. A pressure monitoring tube connects the shutoff valve with the downstream side of the pressure regulator to bias the shutoff valve closed and vent the fluid supply in the event of failure of the pressure regulator.

The principal object of this invention is to provide a normally open shutoff valve interposed in a pressure regulated fluid supply line to a fluid processing vessel for monitoring fluid pressure entering a process vessel and closing the valve in the event of pressure regulator failure and fluid pressure above a predetermined limit.

BRIEF DESCRIPTION OF THE DRAWINGS

FIG. 1 is a vertical cross sectional view, partially in elevation, of the shutoff valve interposed in a line upstream from a fluid pressure regulator supplying fluid to a process vessel;

FIG. 2 is a fragmentary horizontal cross sectional view to an enlarged scale taken substantially along the line 2—2 of FIG. 1;

FIG. 3 is a horizontal cross sectional view taken substantially along the line 3—3 of FIG. 1;

DESCRIPTION OF THE PREFERRED EMBODIMENTS

Figure 4:
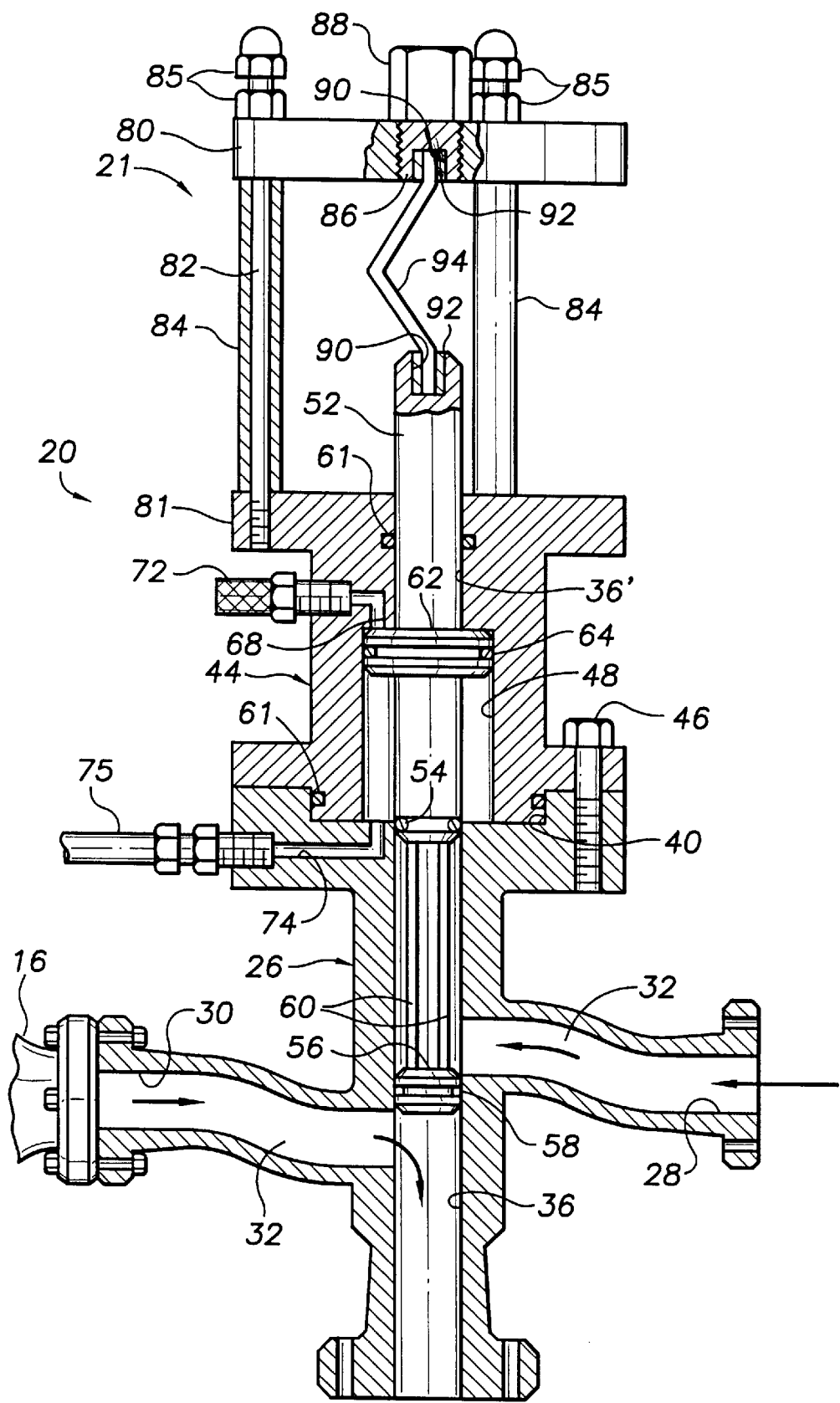
FIG. 4 is a vertical cross sectional view to a larger scale of the shutoff valve in closed position; and, FIG. 5 is a vertical cross sectional view, partially in elevation, of the shutoff valve interposed in a line downstream from a fluid pressure regulator supplying fluid to a process vesel.

Like characters of reference designate like parts in those figures of the drawings in which they occur.

In the drawings:

Referring first to FIGS. 1–4, the reference numeral 10 indicates one arrangement of the components of the apparatus which includes a fluid pressure processing vessel 12 receiving fluid under a predetermined pressure from a line 14, and having a fluid outlet port 15. The numeral 16 indicates a conventional fluid pressure regulator interposed in the fluid supply line 14 upstream from the process vessel 12. The numeral 20 indicates the shutoff valve of this invention as a whole, which is interposed in the fluid line 14 upstream from the pressure regulator 16 and includes a pressure sensing pin cage means 21 which normally maintains the valve in open position.

The shutoff valve 20 comprises a generally cross-shaped flanged end valve body 26 having axially aligned bolt flange ends forming inlet and outlet ports 28 and 30 which are interposed in the line 14 and forms a flow passageway 32 through the body axially offset medially its ends a selected distance at least greater than its diameter for the purpose explained hereinbelow. The valve body is centrally bored through, as at 36, on a diameter substantially equal with the diameter of and normal to the axis of its inlet and outlet ports and intersects the passageway at its axially offset position and is counterbored at its top flanged end 38, as viewed in the drawing, as at 40.

A flanged end bonnet 44 is centrally bored, as at 36', and axially connected by bolts 46 to the body flange 38. The bonnet is counterbored, as at 48, from its depending end.

Valve stem means including a valve stem 52 is longitudinally slidably received at its respective end portions by the housing and bonnet bores 36 and 36', respectively.

An annular seal 54 on the depending end portion of the valve stem 52 seals with the wall of the body bore 36 above the fluid passageway 32. A piston valve 56 slidable in the depending end portion of the body bore 36 is provided with an annular seal 58 for normally closing the depending open end portion of the body bore 36 below the fluid passageway 32 when the valve 20 is in open position (FIG. 1). The piston 56 is preferably secured to the valve stem 52 by a plurality (3) of circumferential and radially spaced rods 60 (FIG. 2) spanning the distance or spacing between the respective upper and lower limits of the passageway 32 offset positions at the intersection with the bore 36 for unobstructed fluid flow through the passageway when the valve is in open position.

Similarly, a piston 62 having a peripheral seal 64 sealing with the counterbore wall secured to the valve stem 52 within the bonnet counterbore 48 for the purposes presently explained.

A pair of O-rings 61 seals the periphery of the valve stem 52 with the bonnet bore 36', and the bonnet 44 with the body flange 38 for reasons believed obvious.

A vent hole 68 through the wall of the bonnet 40 communicates with the counterbore 48 above the piston 62 and is provided with a fluid release or vent cap 72 at its outer end.

A lateral bore 74 in the body flange 38 communicates with the bonnet counterbore 48 below the piston 62 and is connected by tubing 75 with a pressure tap port 76 in the downstream end portion of the regulator 16 for the purposes presently explained.

The pin cage means 21 comprises a plate 80 maintained in spaced parallel relation with respect to the bonnet top flange 81 by a plurality (3) of posts 82 projecting through cooperating bores in the plate 80 and threadedly engaged with the bonnet flange 81 in radial and circumferential equally spaced relation. A like plurality of sleeves 84 surround the posts 82 and post nuts 85 are threadedly connected with the end of the respective post opposite the bonnet.

The plate 80 is centrally bored and threaded for receiving the threaded end portion 86 of a step diameter pin supporting nut 88. The confronting ends of the pin holding nut 88 and the valve stem 52 are axially drilled to form sockets 90 respectively receiving inserts 92 for nesting the respective end portions of a collapsible pin 94.

Figure 5:
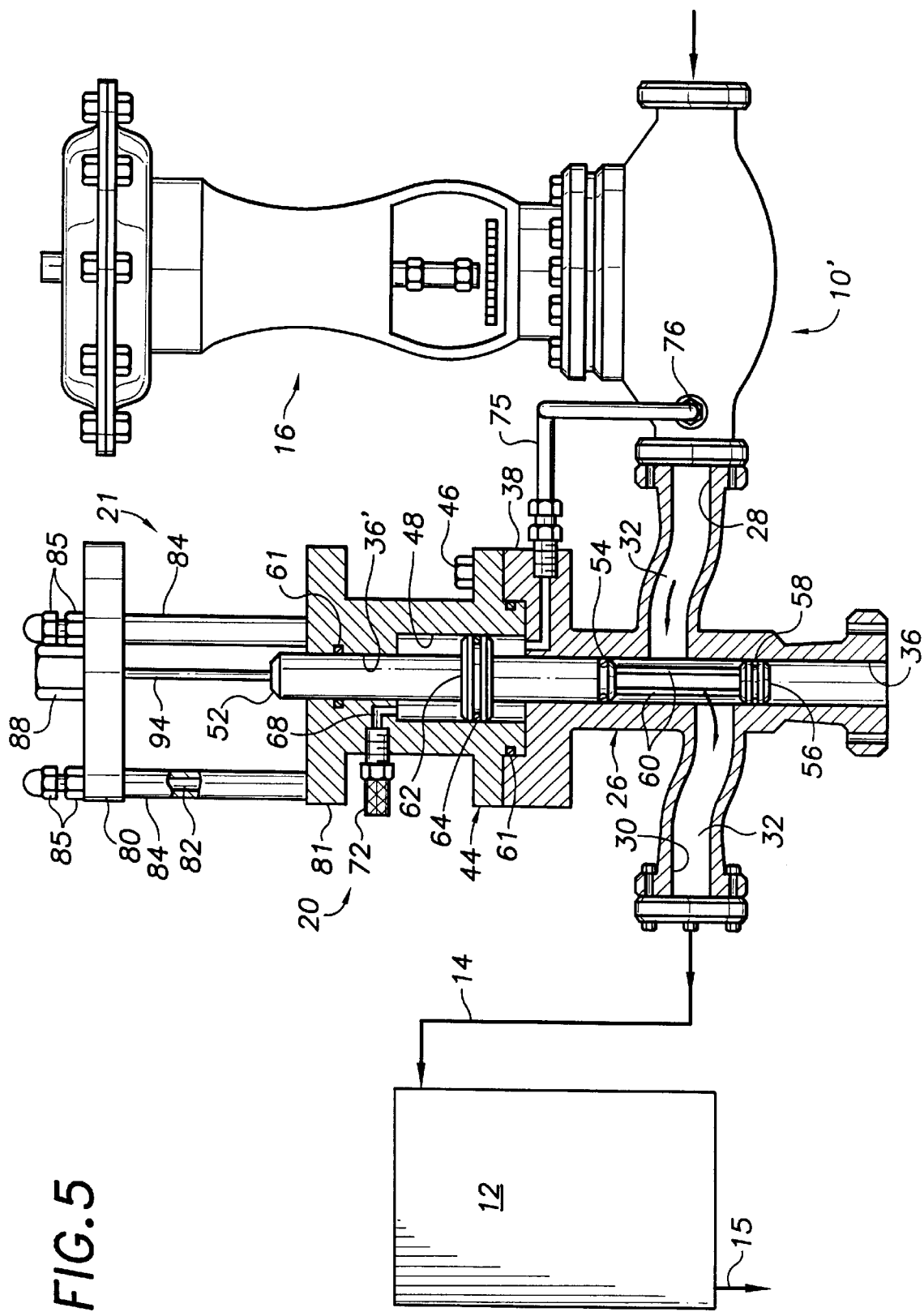

Referring now to FIG. 5, the numeral 10' indicates an alternative arrangement of the components in which the shutoff valve 20 is installed downstream from the regulator 16.

Operation

In normal operation of either embodiment 10 or 10', the fluid process within the vessel 12 continues uninterrupted with fluid flowing through the passageway 32, pressure regulator 16 and line 14. The valve stem assembly, comprising the valve stem 52 and equal diameter piston 56, remains balanced in the position illustrated (FIG. 1) with both ends of the valve stem assembly exposed to atmosphere. The piston 62 senses downstream pressure through line 75. The collapsible pin 94 normally maintains the valve stem assembly in valve passageway open position. The buckling or collapsing point of the pin is set to fail or buckle in response to a predetermined fluid pres-sure in the outlet end portion of the regulator 16.

In the event of pressure regulator failure in the open position, fluid pressure is applied to the depending surface of the piston 62, through the pressure monitoring tube 75, forcing the piston 62 and valve stem 52 in an upward direction toward the valve closed position (FIG. 4) closing the valve passageway 32 and collapsing the pin 94. In the embodiment 10, fluid in the regulator and upstream end portion of the line 14 drains or is conveyed from the depending end portion of the body 26 below the second piston 56.

In the embodiment 10', fluid in the downstream end portion of the passageway 32 and upstream end portion of the line 14 similarly drains from the body 26.

Obviously the invention is susceptible to changes or alterations without defeating its practicability. Therefore, I do not wish to be confined to the preferred embodiment shown in the drawings and described herein.

I claim:

1. A normally open pressure responsive valve for monitoring fluid pressure in the outlet end portion of a fluid pressure regulator interposed in a line supplying fluid under pressure to a process vessel, comprising:

a valve body having a central bore and having inlet and outlet ports forming a fluid passageway normal to and intersecting the central bore and interposed in said line;

a centrally bored and counterbored bonnet forming a continuation of the body central bore;

valve means including a valve stem longitudinally slidable in the body and bonnet bores for opening and closing the fluid passageway;

a piston on said valve stem within the bonnet counterbore, said bonnet having a lateral bore communicating with the bonnet counterbore between said piston and the inward limit of the counterbore;

tubing means connecting the bonnet lateral bore with the fluid under pressure adjacent the downstream limit of the regulator; and, axially collapsible pin means normally maintaining said valve means in fluid passageway open position and closing said passageway in response to fluid pressure downstream from said regulator above a predetermined value moving said piston and valve means in a valve closing direction.

2. The relief valve according to claim 1 in which said pin means comprises:

pin cage means including a plate secured to said bonnet means in axial outstanding relation; and, an elongated rod-like pin axially extending between said valve stem and said plate.

3. The relief valve according to claim 2 in which said pin cage means further includes:

a plurality of post means surrounding said pin in radially spaced relation for connecting said plate with said bonnet.

4. A normally open pressure responsive valve for monitoring fluid pressure in the outlet end portion of a fluid pressure regulator interposed in a line supplying fluid under pressure to a process vessel, comprising:

a valve body having a central bore and having inlet and outlet ports forming a fluid passageway normal to and intersecting the central bore and interposed in said line;

a centrally bored and counterbored valve bonnet forming a continuation of the body central bore;

valve means including a valve stem longitudinally slidable through the body and bonnet bores for opening and closing the fluid passageway;

a first piston on said valve stem within the bonnet counterbore, said bonnet having a lateral bore communicating with the bonnet counterbore between said first piston and the inward limit of the counterbore;

tubing means connecting the bonnet lateral bore with the fluid under pressure adjacent the downstream limit of the regulator; and, axially collapsible pin means normally maintaining said valve means in fluid passageway open position and closing said passageway in response to fluid pressure downstream from said regulator above a predetermined value moving said first piston and valve means in a pin collapsing and passageway closing direction.

5. The relief valve according to claim 4 in which said valve stem is disposed in one end portion of the central bore on one side of the passageway and said valve means further includes:

a second piston in the other end portion of the central bore and opposite side of the passageway when the valve is in open position for closing the valve in response to the collapse of said pin.

6. The relief valve according to claim 5 in which said valve means further includes:

rod means normally extending across the axially offset position of the passageway for connecting said valve stem with said second piston.

7. The relief valve according to claim 6 in which said pin means comprises:

pin cage means including a plate secured to said bonnet in axial outstanding relation; and, an elongated rod-like pin axially extending between said valve stem and said plate.

8. The relief valve according to claim 7 in which said pin cage means further includes:

a plurality of post means surrounding said pin in radially spaced relation for connecting said plate with said bonnet.

* * * * *